United States Patent [19]

Warzelhan et al.

[11] Patent Number: 5,863,991
[45] Date of Patent: Jan. 26, 1999

[54] BIODEGRADABLE POLYMERS, THE PREPARATION THEREOF AND THE USE THEREOF FOR THE PRODUCTION OF BIODEGRADABLE MOLDINGS

[75] Inventors: Volker Warzelhan, Weisenheim; Gunnar Schornick, Neuleiningen; Matthias Kroner, Eisenberg; Ursula Seeliger, Ludwigshafen; Motonori Yamamoto, Mannheim; Gerhard Ramlow, Weinheim, all of Germany

[73] Assignee: BASF Aktiengesellschaft, Ludwigshafen, Germany

[21] Appl. No.: 860,032

[22] PCT Filed: Jan. 9, 1996

[86] PCT No.: PCT/EP96/00064

§ 371 Date: Jul. 3, 1997

§ 102(e) Date: Jul. 3, 1997

[87] PCT Pub. No.: WO96/21691

PCT Pub. Date: Jul. 18, 1996

[30] Foreign Application Priority Data

Jan. 13, 1995 [DE] Germany .................. 19500754.9

[51] Int. Cl.$^6$ ............... C08L 71/02; C08G 65/48
[52] U.S. Cl. ........... 525/426; 535/434; 535/445; 535/448; 528/288; 528/290; 528/291; 528/292; 528/301; 528/302
[58] Field of Search .................. 525/426, 445, 525/434, 448; 528/288, 290, 291, 292, 301, 302

[56] References Cited

U.S. PATENT DOCUMENTS 5,171,308  12/1992  Gallagher ................. 528/302
5,455,311  10/1995  Grigat ..................... 525/439

*Primary Examiner*—Patricia A. Short
*Attorney, Agent, or Firm*—Keil & Weinkauf

[57] ABSTRACT

Biodegradable polyetheresteramides Q1 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight polyetheresteramide Q1 at 25° C.), and a melting point in the range from 50° to 200° C., obtained by reacting a1) from 95 to 99.9% by weight polyetheresteramide P1, obtained by reacting a mixture of b1) 20–95 mol % adipic acid or ester-forming derivatives thereof, and 5–80 mol % terephthalic acid or ester-forming derivatives thereof, and b2) a mixture of a dihydroxy compound selected from $C_2$–$C_6$-alkanediols and $C_5$–$C_{10}$-cycloalkanediols, b22) a dihydroxy compound which contains ether functionalities and has the formula I $$HO-((CH_2)_n-O))_m-H \qquad I$$

where n is 2, 3 or 4 and m is an integer from 2 to 250, and b23) from 0.5 to 80 mol % of an amino-$C_2$–$C_{12}$-alkanol or an amino-$C_5$–$C_{10}$-cycloalkanol, with or without b24) a diamino-$C_1$–$C_8$-alkane, and/or b25) a 2,2'-bisoxazoline where the molar ratio of (b1) to (b2) is in the range from 0.4:1 to 1.5:1, and a2) from 0.1 to 5% by weight of a divinyl ether C1.

15 Claims, No Drawings

BIODEGRADABLE POLYMERS, THE PREPARATION THEREOF AND THE USE THEREOF FOR THE PRODUCTION OF BIODEGRADABLE MOLDINGS

The present invention relates to biodegradable polyetheresteramides Q1 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight polyetheresteramide Q1 at 25° C.), and a melting point in the range from 50° to 200° C., obtainable by reacting a mixture consisting essentially of (a1) from 95 to 99.9% by weight polyetheresteramide P1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide P1 at 25° C.) and a melting point in the range from 50° to 200° C., obtainable by reacting a mixture consisting essentially of (b1) a mixture consisting essentially of
20–95 mol % adipic acid or ester-forming derivatives thereof or mixtures thereof,
5–80 mol % terephthalic acid or ester-forming derivatives thereof or mixtures thereof, and
0–5 mol % of a compound containing sulfonate groups, where the total of the individual mole percentages is 100 mol %, and (b2) a mixture of dihydroxy compounds consisting essentially of (b21) from 15 to 99.3 mol % of a dihydroxy compound selected from the group consisting of $C_2$–$C_6$-alkanediols and $C_5$–$C_{10}$-cycloalkanediols, (b22) from 0.2 to 85 mol % of a dihydroxy compound which contains ether functionalities and has the formula I

where n is 2, 3 or 4 and m is an integer from 2 to 250, or mixtures thereof, (b23) from 0.5 to 80 mol % of an amino-$C_2$–$C_{12}$-alkanol or an amino-$C_5$–$C_{10}$-cycloalkanol and (b24) from 0 to 50 mol % of a diamino-$C_1$–$C_8$-alkane, (b25) from 0 to 50 mol % of a 2,2'-bisoxazoline of the general formula II

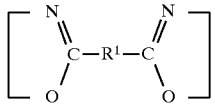

where $R^1$ is a single bond, a $(CH_2)_q$ alkylene group with q=2, 3 or 4, or a phenylene group, where the total of the individual mole percentages is 100 mol %,
where the molar ratio of (b1) to (b2) is chosen in the range from 0.4:1 to 1.5:1, (a2) from 0.1 to 5% by weight of a divinyl ether C1 and (a3) from 0 to 5 mol %, based on component (b1) from the preparation of P1, of compound D.

The invention furthermore relates to polymers and biodegradable thermoplastic molding compositions as claimed in the dependent claims, processes for the preparation thereof, the use thereof for producing biodegradable moldings and adhesives, biodegradable moldings, foams and blends with starch obtainable from the polymers and molding compositions according to the invention.

Polymers which are biodegradable, ie. decompose under environmental influences in an appropriate and demonstrable time span have been known for some time. This degradation usually takes place by hydrolysis and/or oxidation, but predominantly by the action of microorganisms such as bacteria, yeasts, fungi and algae. Y. Tokiwa and T. Suzuki (Nature, 270, (1977) 76–78) describe the enzymatic degradation of aliphatic polyesters, for example including polyesters based on succinic acid and aliphatic diols.

EP-A 565,235 describes aliphatic copolyesters containing [—NH—C(O)O—] groups (urethane units). The copolyesters of EP-A 565,235 are obtained by reacting a prepolyester, which is obtained by reacting essentially succinic acid and an aliphatic diol, with a diisocyanate, preferably hexamethylene diisocyanate. The reaction with the diisocyanate is necessary according to EP-A 565,235 because the polycondensation alone results only in polymers with molecular weights such that they display unsatisfactory mechanical properties. A crucial disadvantage is the use of succinic acid or ester derivatives thereof to prepare the copolyesters because succinic acid and derivatives thereof are costly and are not available in adequate quantity on the market. In addition, the polyesters prepared using succinic acid as the only acid component are degraded only extremely slowly.

A chain extension can, according to EP-A 534,295, also advantageously be achieved by reaction with divinyl ethers.

WO 92/13020 discloses copolyether esters based on predominantly aromatic dicarboxylic acids, short-chain ether diol segments such as diethylene glycol, long-chain polyalkylene glycols such as polyethylene glycol (PEG) and aliphatic diols, where at least 85 mol % of the polyester diol residue comprise a terephthalic acid residue. The hydrophilicity of the copolyester can be increased and the crystallinity can be reduced by modifications such as incorporation of up to 2.5 mol % of metal salts of 5-sulfoisophthalic acid. This is said in WO 92/13020 to make the copolyesters biodegradable. However, a disadvantage of these copolyesters is that biodegradation by microorganisms was not demonstrated, on the contrary only the behavior towards hydrolysis in boiling water was carried out.

According to the statements of Y. Tokiwa and T. Suzuki (Nature, 270 (1977) 76–78 or J. of Appl. Polymer Science, 26 (1981) 441–448), it may be assumed that polyesters which are essentially composed of aromatic dicarboxylic acid units and aliphatic diols, such as PET (polyethylene terephthalate) and PBT (polybutylene terephthalate), are not enzymatically degradable. This also applies to copolyesters and copolyether esters which contain blocks composed of aromatic dicarboxylic acid units and aliphatic diols or ether diols.

Furthermore, Y. Tokiwa, T. Suzuki and T. Ando (J. of Appl. Polym. Sci. Vol. 24 (1979) 1701–1711) prepared polyesteramides and blends of polycaprolactone and various aliphatic polyamides such as polyamide-6, polyamide-66, polyamide-11, polyamide-12 and polyamide-69 by melt condensation and investigated them for their biodegradability by lipases. It was found that the biodegradability of such polyesteramides depends greatly on whether there is a predominantly random distribution of the amide segments or, for example, a block structure. In general, amide segments tend to reduce the rate of biodegradation by lipases. However, the crucial factor is that no lengthy amide blocks are present, because it is known from Plant Cell Physiol. 7 (1966) 93, J. Biochem. 59 (1966) 537 and Agric. Biol. Chem. 39 (1975) 1219 that the usual aliphatic and aromatic polyamides are biodegradable at the most only when oligomers, otherwise not.

Witt et al. (Handout for a poster at the International Workshop of the Royal Institute of Technology, Stockholm, Sweden, Apr. 21–23, 1994) describe biodegradable copolyesters based on 1,3-propanediol, terephthalic ester and adipic or sebacic acid. A disadvantage of these copolyesters is that moldings produced therefrom, especially sheets, have inadequate mechanical properties.

It is an object of the present invention to provide polymers which are degradable biologically, ie. by microorganisms, and which do not have these disadvantages. The intention was, in particular, that the polymers according to the invention be preparable from known and low-cost monomer units and be insoluble in water. It was furthermore the intention that it be possible to obtain products tailored for the desired uses according to the invention by specific modifications such as chain extension, incorporation of hydrophilic groups and groups having a branching action. The aim was moreover that the biodegradation by microorganisms should not be achieved at the expense of the mechanical properties in order not to restrict the number of applications.

We have found that this object is achieved by the polymers and thermoplastic molding compositions defined at the outset.

We have furthermore found processes for the preparation thereof, the use thereof for producing biodegradable moldings and adhesives, and biodegradable moldings, foams, blends with starch and adhesives obtainable from the polymers and molding compositions according to the invention.

The biodegradable polyetheresteramides Q1 according to the invention have a molecular weight ($M_n$) in the range from 6000 to 80,000, preferably from 8000 to 50,000, particularly preferably from 10,000 to 40,000 g/mol, a viscosity number in the range from 30 to 450, preferably from 50 to 400 g/ml (measured in o-dichlorobenzene/phenol (50/50 ratio by weight) at a concentration of 0.5% by weight of polyetheresteramide Q1 at 25° C.), and a melting point in the range from 50° to 200° C., preferably from 60° to 180° C.

The polyetheresteramides Q1 are obtained according to the invention by reacting a mixture consisting essentially of
(a1) from 95 to 99.9, preferably from 96 to 99.8, particularly preferably from 97 to 99.65, % by weight of polyetheresteramide P1,
(a2) from 0.1 to 5, preferably from 0.2 to 4, particularly preferably from 0.35 to 3, % by weight of a divinyl ether C1 and
(a3) from 0 to 5, preferably from 0 to 4, mol %, based on component (b1) from the preparation of P1, of compound D.

Preferred polyetheresteramides P1 have a molecular weight ($M_n$) in the range from 5000 to 80,000, preferably from 6000 to 45,000, particularly preferably from 8000 to 35,000 g/mol, a viscosity number in the range from 30 to 450, preferably from 50 to 400 g/ml (measured in o-dichlorobenzene/phenol (50/50 ratio by weight) at a concentration of 0.5% by weight of polyetheresteramide P1 at 25° C.) and a melting point in the range from 50 to 200, preferably from 60° to 180° C. The polyetheresteramides P1 are, as a rule, obtained by reacting a mixture consisting essentially of
(b1) a mixture consisting essentially of
20–95, preferably from 30 to 80, particularly preferably from 40 to 70, mol % of adipic acid or ester-forming derivatives thereof or mixtures thereof,
5–80, preferably from 20 to 70, particularly preferably from 30 to 60, mol % of terephthalic acid or ester-forming derivatives thereof or mixtures thereof, and
0–5, preferably from 0 to 3, particularly preferably from 0.1 to 2, mol % of a compound which contains sulfonate groups, where the total of the individual mole percentages is 100 mol %, and
(b2) a mixture of dihydroxy compounds consisting essentially of
(b21) from 15 to 99.3, preferably from 60 to 99, particularly preferably from 70 to 97.5 mol % of a dihydroxy compound selected from the group consisting of $C_2$–$C_6$-alkanediols and $C_5$–$C_{10}$-cycloalkanediols,
(b22) from 0.2 to 85, preferably from 0.5 to 40, particularly preferably from 0.5 to 30, mol % of a dihydroxy compound containing ether functionalities and having formula I $$HO-[(CH_2)_n-O]_m-H \qquad I$$

where n is 2, 3 or 4, preferably two or three, particularly preferably two, and m is an integer from 2 to 250, preferably from two to 100, or mixtures thereof,
(b23) from 0.5 to 80, preferably from 0.5 to 50, particularly preferably from 1 to 30, mol % of an amino-$C_2$–$C_{12}$-alkanol or amino-$C_5$–$C_{10}$-cycloalkanol, and
(b24) from 0 to 50, preferably from 0 to 35, particularly preferably from 0.5 to 30, mol % of a diamino-$C_1$–$C_8$-alkane,
(b25) from 0 to 50, preferably from 0 to 30, particularly preferably from 0.5 to 20, mol % of a 2,2'-bisoxazoline of the general formula II

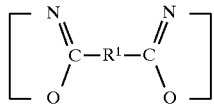

where $R^1$ is a single bond, a $(CH_2)_q$ alkylene group with q=2, 3 or 4, or a phenylene group, where the total of the individual mole percentages is 100 mol %,
where the molar ratio of (b1) to (b2) is chosen in the range from 0.4:1 to 1.5:1, preferably from 0.6:1 to 1.25:1.

The compound containing sulfonate groups which is normally employed is an alkali metal or alkaline earth metal salt of a dicarboxylic acid containing sulfonate groups, or the ester-forming derivatives thereof, preferably alkali metal salts of 5-sulfoisophthalic acid or mixtures thereof, particularly preferably the sodium salt.

The dihydroxy compounds (b21) employed according to the invention are selected from the group consisting of $C_2$–$C_6$-alkanediols and $C_5$–$C_{10}$-cycloalkanediols, such as ethylene glycol, 1,2- and 1,3-propanediol, 1,2- and 1,4-butanediol, 1,5-pentanediol or 1,6-hexanediol, in particular ethylene glycol, 1,3-propanediol and 1,4-butanediol, cyclopentanediol, cyclohexanediol, 1,2-cyclohexanedimethanol, 1,4-cyclohexanedimethanol, particularly preferably ethylene glycol and 1,4-butanediol, and mixtures thereof.

The dihydroxy compounds (b22) which are preferably employed are diethylene glycol, triethylene glycol, polyethylene glycol, polypropylene glycol and polytetrahydrofuran (poly-THF), also mixtures thereof or compounds which have different n's (see formula I), for example polyethylene glycol which contains propylene units (n=3) for example obtainable by polymerization by conventional methods of initially ethylene oxide and subsequently with propylene oxide. The molecular weight ($M_n$) is usually chosen in the range from 250 to 8000, preferably from 600 to 3000, g/mol.

The amino-$C_2$–$C_{12}$-alkanol or amino-$C_5$–$C_{10}$-cycloalkanol (component b23), this being intended also to include 4-aminomethylcyclo-hexanemethanol, which is preferably employed is an amino-$C_2$–$C_6$-alkanol such as 2-aminoethanol, 3-aminopropanol, 4-aminobutanol, 5-aminopentanol, 6-aminohexanol, or amino-$C_5$–$C_6$-cycloalkanols such as aminocyclopentanol and aminocyclohexanol or mixtures thereof.

The diamino-$C_1$–$C_8$-alkane (b24) which is preferably employed is a diamino-$C_4$–$C_6$-alkane such as 1,4-diaminobutane, 1,5-diaminopentane and 1,6-diaminohexane (hexamethylenediamine, HMD).

The compounds of the general formula II (component b25) are, as a rule, obtainable by the process of Angew. Chem. Int. Edit. 11 (1972) 287–288.

From 0 to 5, preferably from 0.01 to 4 mol %, particularly preferably from 0.05 to 4, mol %, based on component (a1), of at least one compound D with at least three groups capable of ester formation are used according to the invention.

The compounds D preferably contain three to ten functional groups capable of forming ester linkages. Particularly preferred compounds D have three to six functional groups of this type in the molecule, in particular three to six hydroxyl groups and/or carboxyl groups. Examples which may be mentioned are:

tartaric acid, citric acid, malic acid;

trimethylolpropane, trimethylolethane;

pentaerythritol;

polyethertriols;

glycerol;

trimesic acid;

trimellitic acid or anhydride;

pyromellitic acid or dianhydride and hydroxyisophthalic acid.

When compounds D which have a boiling point below 200° C. are used in the preparation of the polyesters P1, a proportion may distil out of the polycondensation mixture before the reaction. It is therefore preferred to add these compounds in an early stage of the process, such as the transesterification or esterification stage, in order to avoid this complication and in order to achieve the maximum possible uniformity of their distribution within the polycondensate.

In the case of compounds D which boil above 200° C., they can also be employed in a later stage of the process.

By adding the compound D it is possible, for example, to alter the melt viscosity in a desired manner, to increase the impact strength and to reduce the crystallinity of the polymers or molding compositions according to the invention.

The preparation of the biodegradable polyetheresteramides P1 is known in principle (Sorensen and Campbell, Preparative Methods of Polymer Chemistry, Interscience Publishers, Inc., New York, 1961, pages 111–127; Encycl. of Polym. Science and Eng., Vol. 12, 2nd Ed., John Wiley & Sons, 1988, pages 1–75, in particular pages 59 and 60; Kunststoff-Handbuch, Volume 3/1, Carl Hanser Verlag, Munich, 1992, pages 15–23 (preparation of polyesteramides); WO 92/13019; EP-A 568,593; EP-A 565, 235; EP-A 28.687 (preparation of polyesters); GB 818,157; GB 1,010,916; GB 1,115,512), so that details on this are superfluous.

Thus, for example, the reaction of dimethyl esters of component (b1) with component (b2) can be carried out at from 160° to 230° C. in the melt under atmospheric pressure, advantageously under an inert gas atmosphere.

In a preferred embodiment, first the required amino hydroxy compound (b23) is reacted with component (b1), preferably terephthalic acid, dimethyl terephthalate, adipic acid, di-$C_2$–$C_6$-alkyl adipate, succinic anhydride, phthalic anhydride, in a molar ratio of 2:1.

In another preferred embodiment, the required diamine compound (b24) is reacted with component (b1), preferably terephthalic acid, dimethyl terephthalate, adipic acid, di-$C_2$–$C_6$-alkyl adipate, succinic anhydride, phthalic anhydride, in a molar ratio of at least 0.5:1, preferably 0.5:1.

In another preferred embodiment, the required bisoxazoline compound (b25) is reacted with component (b1), preferably terephthalic acid, dimethyl terephthalate, adipic acid, di-$C_2$–$C_4$-alkyl adipate, succinic anhydride, phthalic anhydride, in a molar ratio of at least 0.5:1, preferably 0.5:1.

In the preparation of the biodegradable polyetheresteramide P1 it is advantageous to use a molar excess of component (b2) relative to component (b1), for example up to 2½ times, preferably up to 1.67 times.

The biodegradable polyetheresteramide P1 is normally prepared with addition of suitable conventional catalysts (Encycl. of Polym. Science and Eng., Vol. 12, 2nd Ed., John Wiley & Sons, 1988, pages 1–75, in particular pages 59–60; GB 818,157; GB 1,010,916; GB 1,115,512), for example metal compounds based on the following elements such as Ti, Ge, Zn, Fe, Mn, Co, Zr, V, Ir, La, Ce, Li and Ca, preferably organometallic compounds based on these metals, such as salts of organic acids, alkoxides, acetylacetonates and the like, particularly preferably based on lithium, zinc, tin and titanium.

When dicarboxylic acids or anhydrides thereof are used as component (b1), esterification thereof with component (b2) can take place before, at the same time as or after the transesterification. For example, the process described in DE-A 23 26 026 for preparing modified polyalkylene terephthalates can be used.

After the reaction of components (b1) and (b2), the polycondensation is carried out as far as the desired molecular weight, as a rule under reduced pressure or in a stream of inert gas, for example of nitrogen, with further heating to from 180° to 260° C.

In order to prevent unwanted degradation and/or side reactions, it is also possible in this stage of the process if required to add stabilizers (see EP-A 21 042 and U.S. Pat. No. 4,321,341). Examples of such stabilizers are the phosphorus compounds described in EP-A 13 461, U.S. Pat. No. 4,328,049 or in B. Fortunato et al., Polymer Vol. 35, No. 18, pages 4006–4010, 1994, Butterworth-Heinemann Ltd. These may also in some cases act as inactivators of the catalysts described above. Examples which may be mentioned are: organophosphites, phosphonous acid and phosphorous acid. Examples of compounds which act only as stabilizers are: trialkyl phosphites, triphenyl phosphite, trialkyl phosphates, triphenyl phosphate and tocopherol (obtainable as Uvinul® 2003AO (BASF) for example).

On use of the biodegradable copolymers according to the invention, for example in the packaging sector, eg. for foodstuffs, it is as a rule desirable to select the lowest possible content of catalyst employed and not to employ any toxic compounds. In contrast to other heavy metals such as lead, tin, antimony, cadmium, chromium, etc., titanium and zinc compounds are non-toxic as a rule (Sax Toxic Substance Data Book, Shizuo Fujiyama, Maruzen, K. K., 360 S. (cited in EP-A 565,235), see also Römpp Chemie Lexikon Vol. 6, Thieme Verlag, Stuttgart, N.Y., 9th Edition, 1992, pages 4626–4633 and 5136–5143). Examples which may be mentioned are: dibutoxydiacetoacetoxytitanium, tetrabutyl orthotitanate and zinc(II) acetate.

The ratio by weight of catalyst to biodegradable polyetheresteramide P1 is normally in the range from 0.01:100 to 3:100, preferably from 0.05:100 to 2:100, it also being possible to employ smaller quantities, such as 0.0001:100, in the case of highly active titanium compounds.

The catalyst can be employed right at the start of the reaction, directly shortly before the removal of the excess diol or, if required, also distributed in a plurality of portions during the preparation of the biodegradable polyetheresteramides P1. It is also possible if required to employ different catalysts or mixtures thereof.

According to observations to date, all conventional and commercially obtainable divinyl ethers can be employed as divinyl ethers C1. Divinyl ethers selected from the group consisting of 1,4-butanediol divinyl ether, 1,6-hexanediol divinyl ether and 1,4-cyclohexanedimethanol divinyl ether are preferably employed.

The preferably cation-catalyzed reaction of the polyetheresteramide P1 with the divinyl ether C1 preferably takes place in the melt, it being necessary to take care that, where possible, no side reactions which may lead to crosslinking or gel formation occur.

In a particular embodiment, the reaction is normally carried out at from 90 to 230, preferably from 100° to 200° C., and the divinyl ether is advantageously added in several portions or continuously.

If required, the reaction of the polyetheresteramides P1 with the divinyl ether C1 can also be carried out in the presence of conventional inert solvents such as toluene, methyl ethyl ketone, tetrahydrofuran (THF) or ethyl acetate or mixtures thereof, in which case the reaction is, as a rule, carried out in the range from 80 to 200, preferably from 90° to 150° C.

The reaction with the divinyl ether C1 can be carried out batchwise or continuously, for example in stirred vessels, reaction extruders or through mixing heads.

It is also possible to employ in the reaction of the polyetheresteramides P1 with the divinyl ethers C1 conventional catalysts which are disclosed in the prior art (for example those described in EP-A 534,295) or which can be or have been used in the preparation of the polyetheresteramides P1 and Q2 and, if the polyetheresteramides P1 have not been isolated in the preparation of the polyetheresteramides Q1, can now be used further. Examples which may be mentioned are: organic carboxylic acids such as oxalic acid, tartaric acid and citric acid, it preferably being necessary to take care that, if possible, no toxic compounds are employed.

Although the theoretical optimum for the reaction of P1 with divinyl ethers C1 is a 1:1 molar ratio of vinyl ether function to P1 end group (polyetheresteramides P1 with mainly hydroxyl end groups are preferred), the reaction can also be carried out without technical problems at molar ratios of from 1:3 to 1.5:1. With molar ratios of >1:1 it is possible if desired to add, during the reaction or else after the reaction, a chain extender selected from the components (b2), preferably a $C_2$–$C_6$-diol.

The biodegradable polymers T1 according to the invention have a molecular weight ($M_n$) in the range from 8000 to 80,000, preferably from 8000 to 50,000, particularly preferably from 10,000 to 40,000 g/mol, a viscosity number in the range from 30 to 450, preferably from 50 to 400 g/ml (measured in o-dichlorobenzene/phenol (50/50 ratio by weight) at a concentration of 0.5% by weight of polymer T1 at 25° C.) and a melting point in the range from 50 to 255, preferably from 60° to 255° C.

The biodegradable polymers T1 are obtained according to the invention by reacting a polyetheresteramide Q2 with (d1) 0.1–5, preferably from 0.2 to 4, particularly preferably from 0.3 to 3% by weight, based on the polyetheresteramide Q2, of divinyl ether C1 and with (d2) 0–5, preferably from 0 to 4 mol %, based on component (b1) from the preparation of polyetheresteramide Q2 via polyetheresteramide P1, of compound D.

This normally results in a chain extension, and the resulting polymer chains preferably have a block structure.

Preferred biodegradable polyetheresteramides Q2 have a molecular weight ($M_n$) in the range from 5000 to 80,000, preferably from 6000 to 50,000, particularly preferably from 8000 to 40,000, a viscosity number in the range from 30 to 450, preferably from 50 to 400 g/ml (measured in o-dichlorobenzene/phenol (50/50 ratio by weight) at a concentration of 0.5% by weight of polyetheresteramide Q2 at 25° C.), and a melting point in the range from 50 to 255, preferably from 60° to 255° C.

The polyetheresteramides Q2 are generally obtained by reacting a mixture consisting essentially of (c1) polyetheresteramide P1, (c2) 0.01–50, preferably from 0.1 to 40, % by weight, based on (c1), of amino carboxylic acid B1, where the amino carboxylic acid B1 is selected from the group consisting of the natural amino acids, polyamides with a molecular weight not exceeding 18,000 g/mol, preferably not exceeding 15,000 g/mol, and compounds which are defined by the formulae IIa or IIb

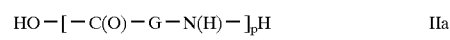

$$HO-[-C(O)-G-N(H)-]_pH \quad \text{IIa}$$

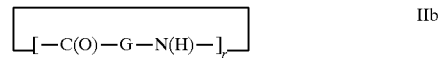

$$[-C(O)-G-N(H)-]_r \quad \text{IIb}$$

where p is an integer from 1 to 1500, preferably from 1 to 1000, and r is 1, 2, 3 or 4, preferably 1 and 2, and G is a radical selected from the group consisting of phenylene, —$(CH_2)_n$—, where n is an integer from 1 to 12, preferably 1, 5 or 12, —$C(R^2)H$— and —$C(R^2)HCH_2$, where $R^2$ is methyl or ethyl, and polyoxazolines of the general formula III

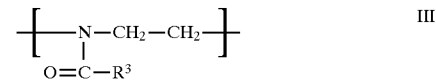

$$\left[ -N-CH_2-CH_2- \right]_{\substack{| \\ O=C-R^3}} \quad \text{III}$$

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or is tetrahydrofuryl, and (c3) 0–5, preferably from 0 to 4, mol %, based on component (b1) from the preparation of P1, of compound D.

The natural amino acids which are preferably employed are the following: glycine, aspartic acid, glutamic acid, alanine, valine, leucine, isoleucine, tryptophan, phenylalanine and oligo- and polymers obtainable therefrom, such as polyaspartimides and polyglutamimides, particularly preferably glycine.

The polyamides employed are those obtainable by polycondensation of a dicarboxylic acid with 4 to 6 carbon atoms and a diamine with 4 to 10 carbon atoms, such as tetramethylenediamine, pentamethylenediamine, hexamethylenediamine, heptamethylenediamine, octamethylenediamine, nonamethylenediamine and decamethylene-diamine.

Preferred polyamides are polyamide-46, polyamide-66 and polyamide-610. These polyamides are generally prepared by conventional methods. It is self-evident that these polyamides can contain conventional additives and auxiliaries and that these polyamides can be prepared by using appropriate regulators.

The polyoxazolines III are, as a rule, prepared by the process described in DE-A 1,206,585.

Particularly preferred compounds defined by the formulae IIa or IIb are: 6-aminohexanoic acid, caprolactam, laurolactam and the oligomers and polymers thereof with a molecular weight not exceeding 18,000 g/mol.

The reaction of the polyetheresters P1 with the amino carboxylic acid B1, if required in the presence of compound D, preferably takes place in the melt at from 120° to 260° C. under an inert gas atmosphere, if desired also under reduced pressure. The procedure can be both batchwise and continuous, for example in stirred vessels or (reaction) extruders.

The reaction rate can, if required, be increased by adding conventional transesterification catalysts (see those described hereinbefore for the preparation of the polyetheresteramides P1).

When components B1 with higher molecular weights, for example with a p above 10 (ten) are used, it is possible to obtain, by reaction with the polyetheresteramides P1 in stirred vessels or extruders, the desired block structures by the choice of the reaction conditions such as temperature, holdup time, addition of transesterification catalysts such as the abovementioned. Thus, J. of Appl. Polym. Sci., 32 (1986) 6191–6207 and Makromol. Chemie, 136 (1970) 311–313 disclose that in the reaction of polyether esters in the melt it is possible to obtain from a blend by transesterification reactions initially block copolymers and then random copolymers.

The reaction is normally carried out in a similar way to the preparation of the polyetheresteramides Q1.

The biodegradable polymers T2 according to the invention have a molecular weight ($M_n$) in the range from 8000 to 80,000, preferably from 8000 to 50,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polymer T2 at 25° C.), and a melting point in the range from 50 to 255, preferably from 60° to 255° C.

The biodegradable polymers T2 are obtained according to the invention by reacting the polyetheresteramide Q1 with (e1) 0.01–50, preferably from 0.1 to 40, % by weight, based on the polyetheresteramide Q1, of amino carboxylic acid B1 and with (e2) 0–5, preferably from 0 to 4, mol %, based on component (b1) from the preparation of polyetheresteramide Q1 via polyetheresteramide P1, of compound D, the process expediently being similar to the reaction of polyetheresteramide P1 with amino carboxylic acid B1 to give polyetheresteramide Q2.

The biodegradable polymers T3 according to the invention have a molecular weight ($M_n$) in the range from 8000 to 80,000, preferably from 8000 to 50,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polymer T3 at 25° C.), and a melting point in the range from 50 to 255, preferably from 60° to 255° C.

The biodegradable polymers T3 are obtained according to the invention by reacting (f1) polyetheresteramide P2, or (f2) a mixture consisting essentially of polyetheresteramide P1 and 0.01–50, preferably from 0.1 to 40, % by weight, based on polyetheresteramide P1, of amino carboxylic acid B1, or (f3) a mixture consisting essentially of polyetheresteramides P1 which differ from one another in composition with 0.1–5, preferably from 0.2 to 4, particularly preferably from 0.3 to 2.5, % by weight, based on the amount of polyetheresteramides employed, of divinyl ether C1 and with 0–5, preferably from 0 to 4, mol %, based on the particular molar quantities of component (b1) employed to prepare the polyetheresteramides (f1) to (f3) employed, of compound D, the reactions expediently being carried out in a similar way to the preparation of the polyetheresteramides Q1 from the polyetheresteramides P1 and the divinyl ethers C1.

Preferred biodegradable polyetheresteramides P2 have a molecular weight ($M_n$) in the range from 5000 to 80,000, preferably from 6000 to 45,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polyetheresteramide P2 at 25° C.) and a melting point in the range from 50 to 255, preferably from 60° to 255° C.

The biodegradable polyetheresters P2 are obtained as a rule by reacting a mixture consisting essentially of (g1) a mixture consisting essentially of
20–95, preferably from 25 to 80, particularly preferably from 30 to 70, mol % of adipic acid or ester-forming derivatives thereof or mixtures thereof,
5–80, preferably from 20 to 75, particularly preferably from 30 to 70, mol % of terephthalic acid or ester-forming derivatives thereof or mixtures thereof, and
0–5, preferably from 0 to 3, particularly preferably from 0.1 to 2, mol % of a compound which contains sulfonate groups, where the total of the individual mole percentages is 100 mol %, and (g2) mixture (b2),
where the molar ratio of (g1) to (g2) is chosen in the range from 0.4:1 to 1.25:1, preferably from 0.6:1 to 1.25:1, (g3) from 0.01 to 40, preferably from 0.1 to 30, % by weight, based on component (g1), of amino carboxylic acid B1, and (g4) from 0 to 5, preferably from 0 to 4, particularly preferably from 0.01 to 3.5, mol %, based on component (g1), of compound D.

The biodegradable polyetheresteramides P2 are expediently prepared in a similar way to the preparation of the polyetheresteramides P1, it being possible to add the amino carboxylic acid B1 both at the start of the reaction and after the esterification or transesterification stage.

In a preferred embodiment, polyetheresteramides P2 whose repeating units are randomly distributed in the molecule are employed.

The biodegradable thermoplastic molding compositions T4 are obtained according to the invention by mixing in a conventional way, preferably with the addition of conventional additives such as stabilizers, processing aids, fillers etc. (see J. of Appl. Polym. Sc., 32 (1986) 6191–6207; WO 92/0441; EP 515,203; Kunststoff-Handbuch, Vol. 3/1, Carl Hanser Verlag, Munich, 1992, pages 24–28).

(h1) 99.5–0.5% by weight of polyetheresteramide Q1 with (h2) 0.5–99.5% by weight of hydroxy carboxylic acid H1 of the general formula Va or Vb

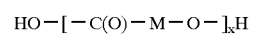

$$HO-[-C(O)-M-O-]_kH \qquad Va$$

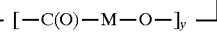

$$[-C(O)-M-O-]_y \quad Vb$$

where x is an integer from 1 to 1500, preferably from 1 to 1000, and y is 1, 2, 3 or 4, preferably 1 and 2, and M is a radical selected from the group consisting of phenylene, —$(CH_2)_z$— where z is an integer from 1, 2, 3, 4 or 5, preferably 1 and 5, —$C(R^2)H$— and —$C(R^2)HCH_2$, where $R^2$ is methyl or ethyl.

The hydroxy carboxylic acid H1 employed in a preferred embodiment is: glycolic acid, D-, L- or D,L-lactic acid, 6-hydroxyhexanoic acid, the cyclic derivatives thereof such as glycolide (1,4-di-oxane-2,5-dione), D-, L-dilactide (3,6-dimethyl-1,4-di-oxane-2,5-dione), p-hydroxybenzoic acid and the oligomers and polymers thereof such as poly-3-hydroxybutyric acid, polyhydroxyvaleric acid, polylactide (obtainable as EcoPLA® (from Cargill) for example) and a mixture of poly-3-hydroxybutyric acid and polyhydroxyvaleric acid (the latter is obtainable from Zeneca under the name Biopol®).

In a preferred embodiment, high molecular weight hydroxy carboxylic acids H1 such as polycaprolactone or polylactide or polyglycolide with a molecular weight ($M_n$) in the range from 10,000 to 150,000, preferably from 10,000 to 100,000, g/mol are employed.

WO 92/0441 and EP-A 515,203 disclose that high molecular weight polylactide without added plasticizers is too brittle for most applications. It is possible in a preferred embodiment to prepare a blend starting from 0.5–20, preferably from 0.5 to 10, % by weight of polyetheresteramide Q1 and 99.5–80, preferably from 99.5 to 90, % by weight of polylactide, which displays a distinct improvement in the mechanical properties, for example an increase in the impact strength, compared with pure polylactide.

Another preferred embodiment relates to a blend obtainable by mixing from 99.5 to 40, preferably from 99.5 to 60, % by weight of polyetheresteramide Q1 and from 0.5 to 60, preferably from 0.5 to 40, % by weight of a higher molecular weight hydroxy carboxylic acid H1, particularly preferably polylactide, polyglycolide, poly-3-hydroxybutyric acid and polycaprolactone. Blends of this type are completely biodegradable and, according to observations to date, have very good mechanical properties.

According to observations to date, the thermoplastic molding compositions T4 according to the invention are preferably obtained by observing short mixing times, for example when carrying out the mixing in an extruder. It is also possible to obtain molding compositions which have predominantly blend structures by choice of the mixing parameters, in particular the mixing time and, if required, the use of inactivators, ie. it is possible to control the mixing process so that transesterification reactions can also take place at least partly.

In another-preferred embodiment it is possible to replace 0–50, preferably 0–30, mol % of the adipic acid or the ester-forming derivatives thereof or the mixtures thereof by at least one other aliphatic $C_4$–$C_{10}$- or cycloaliphatic $C_5$–$C_{10}$-dicarboxylic acid or dimer fatty acid such as succinic acid, glutaric acid, pimelic acid, suberic acid, azelaic acid or sebacic acid or an ester derivate such as the di-$C_1$–$C_6$-alkyl esters thereof or the anhydrides thereof such as succinic anhydride, or mixtures thereof, preferably succinic acid, succinic anhydride, sebacic acid, dimer fatty acid and di-$C_1$–$C_6$-alkyl esters such as dimethyl, diethyl, di-n-propyl, diisobutyl, di-n-pentyl, dineopentyl, di-n-hexyl esters thereof, especially dimethyl succinate.

A particularly preferred embodiment relates to the use as component (b1) of the mixture, described in EP-A 7445, of succinic acid, adipic acid and glutaric acid and the $C_1$–$C_6$-alkyl esters thereof such as dimethyl, diethyl, di-n-propyl, diisobutyl, di-n-pentyl, dineopentyl, di-n-hexyl esters, especially the dimethyl esters thereof.

In another preferred embodiment it is possible to replace 0–50, preferably 0–40, mol % of the terephthalic acid or the ester-forming derivatives thereof, or the mixtures thereof, by at least one other aromatic dicarboxylic acid such as isophthalic acid, phthalic acid or 2,6-naphthalenedicarboxylic acid, preferably isophthalic acid, or an ester derivative such as a di-$C_1$–$C_6$-alkyl ester such as dimethyl, diethyl, di-n-propyl, diisobutyl, di-n-pentyl, dineopentyl, di-n-hexyl ester, in particular a dimethyl ester, or mixtures thereof.

It should be noted in general that the various polymers according to the invention can be worked up in a conventional way by isolating the polymers or, in particular if it is wished to react the polyetheresteramides P1, P2, Q2 and Q1 further, by not isolating the polymers but immediately processing them further.

The polymers according to the invention can be applied to coating substrates by rolling, spreading, spraying or pouring. Preferred coating substrates are those which are compostable or rot such as moldings of paper, cellulose or starch.

The polymers according to the invention can also be used to produce moldings which are compostable. Moldings which may be mentioned by way of example are: disposable articles such as crockery, cutlery, refuse sacks, sheets for agriculture to advance harvesting, packaging sheets and vessels for growing plants.

It is furthermore possible to spin the polymers according to the invention into threads in a conventional way. The threads can, if required, be stretched, stretch-twisted, stretch-wound, stretch-warped, stretch-sized and stretch-texturized by customary methods. The stretching to flat yarn can moreover take place in the same working step (fully drawn yarn or fully oriented yarn) or in a separate step. The stretch warping, stretch sizing and stretch texturizing are generally carried out in a working step separate from the spinning. The threads can be further processed to fibers in a conventional way. Sheet-like structures can then be obtained from the fibers by weaving or knitting.

The moldings, coating compositions and threads etc. described above can, if required, also contain fillers which can be incorporated during the polymerization process at any stage or subsequently, for example in a melt of the polymers according to the invention.

It is possible to add from 0 to 80 % by weight of fillers, based on the polymers according to the invention. Examples of suitable fillers are carbon black, starch, lignin powder, cellulose fibers, natural fibers such as sisal and hemp, iron oxides, clay minerals, ores, calcium carbonate, calcium sulfate, barium sulfate and titanium dioxide. The fillers can in some cases also contain stabilizers such as tocopherol (vitamin E), organic phosphorus compounds, mono-, di- and polyphenols, hydroquinones, diarylamines, thioethers, UV stabilizers, nucleating agents such as talc, and lubricants and mold release agents based on hydrocarbons, fatty alcohols, higher carboxylic acids, metal salts of higher carboxylic acids such as calcium and zinc stearate, and montan waxes. Such stabilizers etc. are described in detail in Kunststoff-Handbuch, Vol. 3/1, Carl Hanser Verlag, Munich, 1992, pages 24–28.

The polymers according to the invention can additionally be colored in any desired way by adding organic or inorganic dyes. The dyes can also in the widest sense be regarded as filler.

A particular application of the polymers according to the invention relates to the use as compostable sheet or a compostable coating as outer layer of diapers. The outer layer of the diapers effectively prevents penetration by liquids which are absorbed inside the diaper by the fluff and superabsorbers, preferably by biodegradable superabsorbers, for example based on crosslinked polyacrylic acid or crosslinked polyacrylamide. It is possible to use a web of a cellulose material as inner layer of the diaper. The outer layer of the described diapers is biodegradable and thus compostable. It disintegrates on composting so that the entire diaper rots, whereas diapers provided with an outer layer of, for example, polyethylene cannot be composted without previous reduction in size or elaborate removal of the polyethylene sheet.

Another preferred use of the polymers and molding compositions according to the invention relates to the production of adhesives in a conventional way (see, for example, Encycl. of Polym. Sc. and Eng. Vol. 1, "Adhesive Compositions", pages 547–577). The polymers and molding compositions according to the invention can also be processed as disclosed in EP-A 21042 using suitable tackifying thermoplastic resins, preferably natural resins, by the methods described therein. The polymers and molding compositions according to the invention can also be further processed as disclosed in DE-A 4 234 305 to solvent-free adhesive systems such as hot melt sheets.

Another preferred application relates to the production of completely degradable blends with starch mixtures (preferably with thermoplastic starch as described in WO 90/05161) in a similar process to that described in DE-A 42 37 535. The polymers and thermoplastic molding compositions according to the invention can, according to observations to date, because of their hydrophobic nature, their mechanical properties, their complete biodegradability, their good compatibility with thermoplastic starch and not least because of their favorable raw material basis, advantageously be employed as synthetic blend component.

Further applications relate, for example, to the use of the polymers according to the invention in agricultural mulch, packaging material for seeds and nutrients, substrate in adhesive sheets, baby pants, pouches, bed sheets, bottles, boxes, dust bags, labels, cushion coverings, protective clothing, hygiene articles, handkerchiefs, toys and wipes.

Another use of the polymers and molding compositions according to the invention relates to the production of foams, generally by conventional methods (see EP-A 372 846; Handbook of Polymeric foams and Foam Technology, Hanser Publisher, Munich, 1991, pages 375–408). This normally entails the polymer or molding composition according to the invention being initially melted, if required with the addition of up to 5 % by weight of compound D, preferably pyromellitic dianhydride and trimellitic anhydride, then a blowing agent being added and the resulting mixture being exposed to reduced pressure by extrusion, resulting in foaming.

The advantages of the polymers according to the invention over known biodegradable polymers are a favorable raw material basis with readily available starting materials such as adipic acid, terephthalic acid and conventional diols, interesting mechanical properties due to the combination of "hard" (owing to the aromatic dicarboxylic acids such as terephthalic acid) and "soft" (owing to the aliphatic dicarboxylic acids such as adipic acid) segments in the polymer chain and the variation in uses due to simple modifications, a satisfactory degradation by microorganisms, especially in compost and soil, and a certain resistance to microorganisms in aqueous systems at room temperature, which is particularly advantageous for many applications. The random incorporation of the aromatic dicarboxylic acids of component (b1) in various polymers makes the biological attack possible and thus achieves the desired biodegradability.

A particular advantage of the polymers according to the invention is that it is possible by tailoring the formulations to optimize both the biodegradation and the mechanical properties for the particular application.

It is furthermore possible depending on the preparation process advantageously to obtain polymers with predominantly random distribution of monomer units, polymers with predominantly block structures and polymers with predominantly blend structure or blends.

EXAMPLES

Abbreviations
   TTB: Titanium tetrabutoxide
   DMT: Dimethyl terephthalate
   Preparation of a polyetheresteramide $Q1_a$
   Precursor 1
   4.672 kg of 1,4-butanediol, 7.000 kg of adipic acid and 50 g of tin dioctoate were heated under inert gas (nitrogen) to 230°–240° C. After most of the water formed in the reaction had distilled out, 10 g of TTB were added. As soon as the acid number AN had fallen below 1, the excess butanediol was distilled out under reduced pressure until the OH number reached about 56.
Precursor 2
   58.5 g of DMT were heated with 36.5 g of ethanolamine while stirring slowly under a nitrogen atmosphere to 180° C. After 30 min, 360 g of precursor 1, 175 g of DMT, 0.65 g of pyromellitic dianhydride, 300 g of 1,4-butanediol, 63.5 g of diethylene glycol and 1 g of TTB were added under a nitrogen atmosphere. The methanol and water formed during the transesterification were removed by distillation. The mixture was heated to 230° C. over the course of 3 h while increasing the stirring speed and, after 2 h, 0.4 g of 50% strength aqueous phosphorous acid was added. Over the course of 2 h, the pressure was reduced to 5 mbar and was then kept below 2 mbar and at 240° C. for 45 min, during which the excess 1,4-butanediol distilled out. An elastic, pale brown product was obtained.
   OH number: 16 mg KOH/g
   AN: below 1 mg KOH/g
   prim. amine: below 0.1 g/100 g.
   DSC measurements revealed that precursor 2 had two melting points at 63° C. and 82° C. and a glass transition temperature of –36° C.
   $Q1_a$
   200 g of the precursor 2 were cooled to 170° C., and 4.2 g of 1,4-butanediol divinyl ether were added in 4 portions over the course of 45 min, which led to a distinct increase in the melt viscosity. This points to the increase in molecular weight.
   OH number: 4 mg KOH/g
   AN: below 1 mg KOH/g.
Preparation of biodegradable polymer $T1_a$
   384 g of 1,4-butanediol, 6.1 g of ethanolamine, 316 g of DMT and 1 g of TTB were heated while stirring slowly under a nitrogen atmosphere to 180° C. The methanol formed in the transesterification was distilled out. After adding 101.6 g of adipic acid and 278 g of polyethylene glycol with a molecular weight of 600 g/mol, the mixture was heated to 230° C. under a nitrogen atmosphere while increasing the stirring speed to over the course of 2 h, and the water formed in the condensation was distilled out. Then 62.5 g of a non-extracted, monomer-containing polyamide with a viscosity number of 68 and about 10.5% by weight of residual extract (eg. Ultramid® B15 from BASF) were added under a nitrogen atmosphere. After 2 h, 0.4 g of 50% strength aqueous phosphorous acid was added, the pressure was reduced stepwise to 5 mbar and then kept below 2 mbar and at 230° C. for 45 min, during which the water formed in the condensation and the excess 1,4-butanediol distilled out.

OH number: 19 mg KOH/g
AN: below 1 mg KOH/g.

DSC measurements revealed two melting points at 124° and 216° C. and a glass transition temperature −44° C.

200 g of this product were cooled to 170° C., and 4.95 g of 1,4-butanediol divinyl ether were added in 4 portions over the course of 45 min. The increase in molecular weight was detectable from the distinct increase in melt viscosity.

OH number: 6 mg KOH/g
AN: below 1 mg KOH/g
Enzyme assay with Rhizopus arrhizus: ΔDOC: 82 mg/l/ ΔDOC (PCL): 2455.

Methods of measurement
Enzyme assay

The polymers were cooled with liquid nitrogen or dry ice in a mill and finely ground (the rate of enzymatic breakdown increases with the surface area of the milled material). The enzyme assay was carried out by placing 30 mg of finely ground polymer powder and 2 ml of a 20 mmol/l aqueous $K_2HPO_4/KH_2PO_4$ buffer solution (pH: 7.0) in an Eppendorf tube (2 ml) and equilibrated on a rotator at 37° C. for 3 h. Subsequently 100 units of lipase from either Rhizopus arrhizus, Rhizopus delemar or Pseudomonas pl. were added and incubated on the rotator (250 rpm) at 37° C. for 16 h. The reaction mixture was then filtered through a Millipore® membrane (0.45 μm), and the DOC (dissolved organic carbon) of the filtrate was measured. Similar DOC measurements were carried out in one case only with buffer and enzyme (as enzyme control) and in one case only with buffer and sample (as blank).

The ΔDOC values found (DOC (sample+enzyme)−DOC (enzyme control)−DOC (blank value)) can be regarded as a measure of the enzymatic degradability of the samples. They are presented in each case comparing with a measurement with powder from polycaprolactone® Tone P 787 (Union Carbide). It must be remembered in the assessment that these are not absolutely quantifiable data. The connection between the surface area of the milled material and the speed of enzymatic breakdown has been referred to above. Furthermore the enzyme activities may also vary.

The hydroxyl number (OH number) and acid number (AN) were determined by the following methods:

(a) Determination of the apparent hydroxyl number 10 ml of toluene and 9.8 ml of acetylating reagent (see below) were added to about 1 to 2 g of accurately weighed test substance and heated at 95° C. with stirring for 1 h. Then 5 ml of distilled water were added. After cooling to room temperature, 50 ml of tetrahydrofuran (THF) were added, and potentiographic titration to the turning point was carried out with standard ethanolic KOH solution.

The experiment was repeated without test substance (blank sample).

The apparent OH number was then found from the following formula:

The apparent OH number $c \times t \times 56.1(V2-V1)/m$ (in mg KOH/g)
where c=amount of substance concentration of the standard ethanolic KOH solution in mol/l
t=titer of the standard ethanolic KOH solution
m=weight of test substance in mg
V1=ml of standard solution used with test substance
V2=ml of standard solution used without test substance.

Reagents used:
standard ethanolic KOH solution, c=0.5 mol/l, titer 0.9933 (Merck, Cat. No. 1.09114) acetic anhydride, analytical grade (Merck, Cat. No. 42) pyridine, analytical grade (Riedel de Haen, Cat. No. 33638) acetic acid, analytical grade (Merck, Cat. No. 1.00063) acetylating reagent: 810 ml of pyridine, 100 ml of acetic anhydride and 9 ml of acetic acid water, deionized THF and toluene (b) Determination of the acid number (AN) About 1 to 1.5 g of test substance were weighed accurately, 10 ml of toluene and 10 ml of pyridine were added, and the mixture was then heated to 95° C. After dissolving, the solution was cooled to room temperature, 5 ml of water and 50 ml of THF were added, and titration was carried out with 0.1N standard ethanolic KOH solution.

The determination was repeated without test substance (blank sample).

The acid number was then found from the following formula:

$AN = c \times t \times 56.1(V1-V2)/m$ (in mg KOH/g)
where c=amount of substance concentration of the standard ethanolic KOH solution in mol/l
t=titer of the standard ethanolic KOH solution
m=weight of test substance in mg
V1=ml of standard solution used with test substance
V2=ml of standard solution used without test substance.

Reagents used:
standard ethanolic KOH solution, c=0.1 mol/l, titer= 0.9913 (Merck, Cat. No. 9115) pyridine, analytical grade (Riedel de Haen, Cat. No. 33638) water, deionized THF and toluene (c) Determination of the OH number The OH number is obtained from the sum of the apparent OH number and the AN:

OH number=apparent OH number+AN

The viscosity number (VN) was measured in o-dichlorobenzene/phenol (50/50 ratio by weight) at a concentration of 0.5% by weight of polymer at 25° C.

The DSC measurements were carried out with a DuPont DSC 912 apparatus+thermal analyzer 990. The temperature and enthalpy calibration took place in a conventional way. The weight of sample was typically 13 mg. The heating and cooling rates were 20K/min. The samples were measured under the following conditions: 1. Heating run on samples in the state supplied, 2. Rapid cooling from the melt, 3. Heating run on the samples cooled from the melt (samples from 2). The second DSC runs in each case were used to compare various samples after a uniform thermal history.

We claim:

1. A biodegradable polyetheresteramide Q1 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight polyetheresteramide Q1 at 25° C.), and a melting point in the range from 50° to 200° C., obtained by reacting a mixture of (a1) from 95 to 99.9% by weight polyetheresteramide P1 with a molecular weight ($M_n$) in the range from 5000 to 80,000 g/mol, a viscosity number in the range from 30 to 450 g/ml (measured in o-dichlorbenzene/phenol (50/50 ratio by weight) at a concentration of 0.5% by weight polyetheresteramide P1 at 25° C.) and a melting point in the range from 50° to 200° C. obtainable by reacting a mixture consisting essentially of (b1) a mixture consisting essentially of (b1) 20–95 mol % adipic acid or ester-forming derivatives thereof or mixtures thereof, (b12) 5–80 mol % terephthalic acid or ester-forming derivatives thereof or mixtures thereof, and (b13) 0–5 mol % of a compound containing sulfonate groups, where 0–50 mol % of component (b11) can be replaced by at least one other aliphatic $C_4$–$C_{10}$- or cycloaliphatic $C_5$–$C_{10}$-dicarboxylic acid or dimer fatty acid, and where 0–50 mol % of component (b12) can be replaced by another aromatic dicarboxylic acid, and the total of the individual mole percentages is 100 mol %, and (b2) a mixture of dihydroxy compounds composed of (b21) from 15 to 99.3 mol % of a dihydroxy compound selected from the group consisting of $C_2$–$C_6$-alkanediols and $C_5$–$C_{10}$-cycloalkanediols, (b22) from 0.2 to 85 mol % of a dihydroxy compound which contains ether functionalities and has the formula I

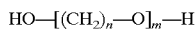

where n is 2, 3 or 4 and m is an integer from 2 to 250, or mixtures thereof, (b23) from 0.5 to 80 mol % of an amino-$C_2$–$C_{12}$-alkanol or an amino-$C_5$–$C_{10}$-cycloalkanol and (b24) from 0 to 50 mol % of a diamino-$C_1$–$C_8$-alkane, (b25) from 0 to 50 mol % of a 2,2'-bisoxazoline of the formula II

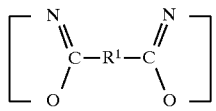

where $R^1$ is a single bond, a $(CH_2)_q$ alkylene group with q=2, 3 or 4, or a phenylene group, where the total of the individual mole percentages is 100 mol %, where the molar ratio of (b1) to (b2) is chosen in the range from 0.4:1 to 1.5:1, (a2) from 0.1 to 5% by weight of a divinyl ether C1 and (a3) from 0 to 5 mol %, based on component (b1) from the preparation of P1, of compound D with at least three groups capable of ester formation.

2. A biodegradable polymer T1 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0–5% by weight of polymer T1 at 25° C.) and a melting point in the range from 50° to 255° C., obtainable by reacting the polyetheresteramide Q2 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide Q2 at 25° C.), and a melting point in the range from 50° to 255° C., obtained by reacting a mixture consisting essentially of (c1) polyetheresteramide P1 as set forth in claim 1, (c2) 0.01–50% by weight, based on (c1), of amino carboxylic acid B1 where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

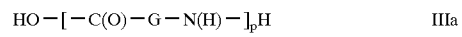

where p is an integer from 1 to 1500 and r is an integer from 1 to 4, and G is a radical which is selected from the group consisting of phenylene, —$(CH_2)_n$— where n is an integer from 1 to 12, —$C(R^2)H$— and —$C(R^2)HCH_2$ where $R^2$ is methyl or ethyl, and polyoxazolines with the repeating unit IV

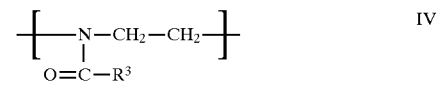

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl,
and (c3) 0–5 mol %, based on the molar quantity of component (b1) used to prepare P1, of compound D with at least three groups capable of ester formation, with (d1) 0.1–5% by weight, based on the polyetheresteramide Q2, of divinyl ether C1, and with (d2) 0–5 mol %, based on the molar quantity of componenet (b1) used to prepare polyetheresteramide Q2, of compound D.

3. A biodegradable polymer T2 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0.5% by weight polymer T2 at 25° C.) and a melting point in the range from 50° to 255° C., obtained by reacting the polyetheresteramide Q1 as claimed in claim 1 with (e1) 0–01–50% by weight, based on polyetheresteramide Q1, of amino carboxylic acid B1 where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

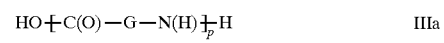

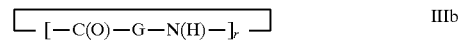

where p is an integer from 1 to 1500 and r is an integer from 1 to 4, and G is a radical which is selected from the group consisting of phenylene, —$(CH_2)_n$— where n is an integer from 1 to 12, —$C(R^2)H$— and —$C(R^2)HCH_2$ where $R^2$ is methyl or ethyl, and polyoxazolines with the repeating unit IV

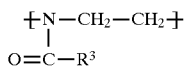  IV where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl,
and with (e2) 0–5 mol %, based on the molar quantity of component (b1) used to prepare polyetheresteramide Q1, of compound D with at least three groups capable of ester formation.

4. A biodegradable polymer T3 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0.5% by weight polymer T3 at 25° C.) and a melting point in the range from 50° to 255° C., obtained by reacting (f1) polyetheresteramide P2 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide P2 at 25° C.) and a melting point in the range from 50° to 255° C., obtained by reacting a mixture consisting essentially of (g1) a mixture consisting essentially of
20–95 mol % adipic acid or ester-forming derivatives thereof or mixtures thereof,
5–80 mol % terephthalic acid or ester-forming derivatives thereof or mixtures thereof, and 0–5 mol % of a compound which contains sulfonate groups, p2 where the total of the individual mole percentages is 100 mol %, (g2) mixture (b2) of dihydroxy compounds composed of (b21) from 15 to 99.3 mol % of a dihydroxy compound selected from the group consisting of $C_2$–$C_6$-alkanediols and $C_5$–$C_{10}$-cycloalkanediols, (b22) from 0.2 to 85 mol % of a dihydroxy compound which contains ether functionalities and has the formula I

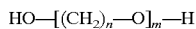  I where n is 2, 3 or 4 and m is an integer from 2 to 250, or mixtures thereof, (b23) from 0.5 to 80 mol % of an amino-$C_2$–$C_{12}$-alkanol or an amino-$C_5$–$C_{10}$-cycloalkanol and (b24) from 0 to 50 mol % of a diamino-$C_1$–$C_8$-alkane, (b25) from 0 to 50 mol % of a 2,2'-bisoxazoline of the formula II

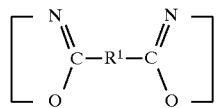  II where $R^1$ is a single bond, a $(CH_2)_q$ alkylene group with q=2, 3 or 4, or a phenylene group, where the total of the individual mole percentages is 100 mol %,
where the molar ratio of (g1) to (g2) is chosen in the range from 0.4:1 to 1.5:1, (g3) from 0.01 to 40% by weight, based on component (g1), of amino carboxylic acid B1, where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

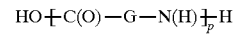  IIIa

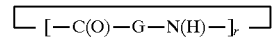  IIIb where p is an integer from 1 to 1500 and r is an integer from 1 to 4, and G is a radical which is selected from the group consisting of phenylene, —$(CH_2)_n$— where n is an integer from 1 to 12, —$C(R^2)H$— and —$C(R^2)HCH_2$— where $R^2$ is methyl or ethyl,
and polyoxazolines with the repeating unit IV

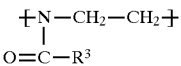  IV where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl,
and (g4) from 0 to 5 mol % based on component (g1), of compound D with at least three groups capable of ester formation, or (f2) a mixture consisting essentially of polyetheresteramide P1 as set forth in claim 1 and 0.01–50% by weight, based on polyetheresteramide P1, of amino carboxylic acid B1,
or (f3) a mixture consisting essentially of polyetheresteramides P1 which differ from one another in composition, with 0.1–5% by weight, based on the amount of polyetheresteramides employed, of divinyl ether C1 and with 0–5 mol %, based on the particular molar quantities of component (g1) or of component (b1) employed to prepare the polyetheresteramides (P2) or the mixtures (f2) or (f3) employed, of compound D with at least three groups capable of ester formation.

5. A biodegradable thermoplastic molding composition T4 obtained by mixing in a conventional way (h1) 99.5–0.5% by weight polyetheresteramide Q1 as defined in claim 1 with (h2) 0.5–99.5% by weight hydroxycarboxylic acid H1 of the formula Va or Vb

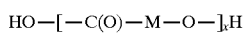 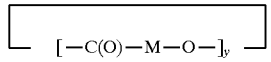

Va          Vb where x is an integer from 1 to 1500 and y is an integer from 1 to 4, and M is a radical which is selected from the group consisting of phenylene, —$(CH_2)_z$—, where z is an integer from 1 to 5, —$C(R^2)H$— and —$C(R^2)HCH_2$— where $R^2$ is methyl or ethyl.

6. A compostable molding obtained from polyetheresters Q1 as defined in claim 1.

7. An adhesive obtained from polyetheresteramides Q1 as defined in claim 1.

8. A biodegradable blend obtained from a mixture comprising polyetheresteramides Q1 as defined in claim 1 and starch.

9. A biodegradable foam obtained from polyetheresteramides as defined in claim 1.

10. A paper coating composition obtained from polyetheresteramides Q1 as defined in claim 1.

11. A process for preparing the biodegradable polyetheresteramides Q1 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight polyetheresteramide Q1 at 25° C.), and a melting point in the range from 50° to 200° C., which comprises, in a first step preparing polyetheresteramide P1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide P1 at 25° C.) and a melting point in the range from 50° to 200° C., obtained by reacting a mixture consisting essentially of
- (b1) a mixture consisting essentially of
  - (b11) 20–95 mol % adipic acid or ester-forming derivatives thereof or mixtures thereof,
  - (b12) 5–80 mol % terephthalic acid or ester-forming derivatives thereof or mixtures thereof, and
  - (b13) 0–5 mol % of a compound containing sulfonate groups, where 0–50 mol % of component (b11) can be replaced by at least one other aliphatic $C_4$–$C_{10}$- or cycloaliphatic $C_5$–$C_{10}$-dicarboxylic acid or dimer fatty acid, and where 0–50 mol % of component (b12) can be replaced by another aromatic dicarboxylic acid, the total of the individual mole percentages being 100 mol %, and
- (b2) a mixture of dihydroxy compounds composed of
- (b21) from 15 to 99.3 mol % of a dihydroxy compound selected from the group consisting of $C_2$–$C_6$-alkanediols and $C_5$–$C_{10}$-cycloalkanediols,
- (b22) from 0.2 to 85 mol % of a dihydroxy compound which contains ether functionalities and has the formula I $$HO-[(CH_2)_n-O]_m-H \qquad I$$

where n is 2, 3 or 4 and m is an integer from 2 to 250, or mixtures thereof,
- (b23) from 0.5 to 80 mol % of an amino-$C_2$–$C_{12}$-alkanol or an amino-$C_5$–$C_{10}$-cycloalkanol and
- (b24) from 0 to 50 mol % of a diamino-$C_1$–$C_8$-alkane,
- (b25) from 0 to 50 mol % of a 2,2'-bisoxazoline of the general formula II $$\left[\begin{array}{c} N \quad\quad N \\ \backslash\backslash \quad\quad // \\ C-R^1-C \\ / \quad\quad \backslash \\ O \quad\quad O \end{array}\right] \qquad II$$

where $R^1$ is a single bond, a $(CH_2)_q$ alkylene group with q=2, 3 or 4, or a phenylene group, where the total of the individual mole percentages is 100 mol %,
where the molar ratio of (b1) to (b2) is chosen in the range from 0.4:1 to 1.5:1,
and in a second step reacting a mixture of
- (a1) from 95 to 94.9% by weight polyetheresteramide P1
- (a2) from 0.1 to 5% by weight divinyl ether C1 and
- (a3) from 0 to 5 mol %, based on the molar quantity of component (b1) used to prepare P1, of compound D with at least three groups capable of ester formation.

12. A process for preparing the biodegradable polymers T1 with a molecular weight ($M_n$) in the range from 8000 to 80,000 g/mol, with a viscosity number in the range from 30 to 450 g/ml (measured in o-dichloro-benzene/phenol (50/50 ratio by weight) at a concentration of 0.5% by weight of polymer T1 at 25° C.) and a melting point in the range from 50° to 255° C., which comprises, in a first step, preparing polyetheresteramide Q2 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide Q2 at 25° C.), and a melting point in the range from 50° to 255° C., obtained by reacting a mixture consisting essentially of
- (c1) polyetheresteramide P1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide P1 at 25° C.) and a melting point in the range from 50° to 200° C., obtained by reacting a mixture consisting essentially of
  - (b1) a mixture consisting essentially of
  - (b11) 20–95 mol % adipic acid or ester-forming derivatives thereof or mixtures thereof,
  - (b12) 5–80 mol % terephthalic acid or ester-forming derivatives thereof or mixtures thereof, and
  - (b13) 0–5 mol % of a compound containing sulfonate groups, where 0–50 mol % of component (b11) can be replaced by at least one other aliphatic $C_4$–$C_{10}$- or cycloaliphatic $C_5$–$C_{10}$-dicarboxylic acid or dimer fatty acid, and where 0–50 mol % of component (b12) can be replaced by another aromatic dicarboxylic acid, where the total of the individual mole percentages being 100 mol %, and
  - (b2) a mixture of dihydroxy compounds composed of
  - (b21) from 15 to 99.3 mol % of a dihydroxy compound selected from the group consisting of $C_2$–$C_6$-alkanediols and $C_5$–$C_{10}$-cycloalkanediols,
  - (b22) from 0.2 to 85 mol % of a dihydroxy compound which contains ether functionalities and has the formula I $$HO-[(CH_2)_n-O]_m-H \qquad I$$

where n is 2, 3 or 4 and m is an integer from 2 to 250, or mixtures thereof,
  - (b23) from 0.5 to 80 mol % of an amino-$C_2$–$C_{12}$-alkanol or an amino-$C_5$–$C_{10}$-cycloalkanol and
  - (b24) from 0 to 50 mol % of a diamino-$C_1$–$C_8$-alkane,
  - (b25) from 0 to 50 mol % of a 2,2'-bisoxazoline of the formula II $$\left[\begin{array}{c} N \quad\quad N \\ \backslash\backslash \quad\quad // \\ C-R^1-C \\ / \quad\quad \backslash \\ O \quad\quad O \end{array}\right] \qquad II$$

where $R^1$ is a single bond, a $(CH_2)_q$ alkylene group with q=2, 3 or 4, or a phenylene group, where the total of the individual mole percentages is 100 mol %,
where the molar ratio of (b1) to (b2) is chosen in the range from 0.4:1 to 1.5:1,
- (a2) from 0.1 to 5% by weight of a divinyl ether C1 and
- (a3) from 0 to 5 mol %, based on component (b1) from the preparation of P1, of compound D with at least three groups capable of ester formation,
- (c2) 0.01–50% by weight, based on (c1), of amino carboxylic acid B1 where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

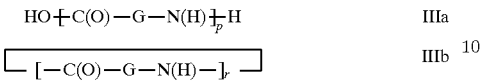

where p is an integer from 1 to 1500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl,
and polyoxazolines with the repeating unit IV

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl,
and (c3) 0–5 mol %, based on the molar quantity of component (b1) used to prepare P1, of compound D,
and, in a second step, reacting Q2 with (d1) 0.1–5% by weight, based on the polyetheresteramide Q2, of divinyl ether C1, and with (d2) 0–5 mol %, based on component (b1) from the preparation of P1, and polyetheresteramide Q2, of compound D with at least three groups capable of ester formation.

13. A process for preparing the biodegradable polymers T2 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0.5% by weight polymer T2 at 25° C.) and a melting point in the range from 50° to 255° C., which comprises, in a first step, preparing polyetheresteramide Q1 with a molecular weight ($M_n$) in the range from 6,000 to 80,000 g/mol a viscosity number in the range from 30 to 450 g/ml (measured in o-dichlorobenzene/phenol (50/50 ratio by weight) at a concentration of 0.5% by weight polyetheresteramide Q1 at 25° C.), and a melting point in the range from 50° to 200° C., obtained by reacting a mixture of (a1) from 95 to 99.9% by weight polyetheresteramide P1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide P1 at 25° C.) and a melting point in the range from 50° to 200° C., obtained by reacting a mixture consisting essentially of (b1) a mixture consisting essentially of (b11) 20–95 mol % adipic acid or ester-forming derivatives thereof or mixtures thereof, (b12) 5–80 mol % terephthalic acid or ester-forming derivatives thereof or mixtures thereof, and (b13) 0–5 mol % of a compound containing sulfonate groups, where 0–50 mol % of component (b11) can be replaced by at least one other aliphatic $C_4$–$C_{10}$- or cycloaliphatic $C_5$–$C_{10}$-dicarboxylic acid or dimer fatty acid, and where 0–50 mol % of component (b12) can be replaced by another aromatic dicarboxylic acid, where the total of the individual mole percentages being 100 mol %, and (b2) a mixture of dihydroxy compounds composed of (b21) from 15 to 99.3 mol % of a dihydroxy compound selected from the group consisting of $C_2$–$C_6$-alkanediols and $C_5$–$C_{10}$-cycloalkanediols, (b22) from 0.2 to 85 mol % of a dihydroxy compound which contains ether functionalities and has the formula I

where n is 2, 3 or 4 and m is an integer from 2 to 250, or mixtures thereof, (b23) from 0.5 to 80 mol % of an amino-$C_2$–$C_{12}$-alkanol or an amino $C_5$–$C_{10}$-cycloalkanol (b24) from 0 to 50 mol % of a diamino-$C_1$–$C_8$-alkane, (b25) from 0 to 50 mol % of a 2,2'-bisoxazoline of the general formula II

where $R^1$ is a single bond, a $(CH_2)_q$ alkylene group with q=2, 3 or 4, or a phenylene group, where the total of the individual mole percentages is 100 mol %,
where the molar ratio of (b1) to (b2) is chosen in the range from 0.4:1 to 1.5:1, (a2) from 0.1 to 5% by weight of a divinyl ether C1 and (a3) from 0 to 5 mol %, based on component (b1) from the preparation of P1, of compound D, with at least three groups capable of ester formation, and, in a second step reacting Q1 with (e1) 0.01 to 50% by weight, based on polyetheresteramide Q1, amino carboxylic acid B1,
where the amino carboxylic acid B1 is selected from the group consisting of the natural amino acids, polyamides with a molecular weight not exceeding 18,000 g/mol, obtainable by polycondensation of a dicarboxylic acid with 4 to 6 carbon atoms and a diamine with 4 to 10 carbon atoms and compounds which are defined by the formulae IIIa and IIIb

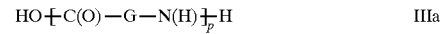
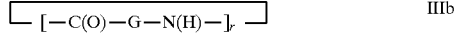

where p is an integer from 1 to 1500 and r is an integer from 1 to 4, and G is a radical which is selected from the group consisting of phenylene, —$(CH_2)_n$—, where n is a integer from 1 to 12, —$C(R^2)H$— and —$C(R^2)HCH_2$, where $R^2$ is methyl or ethyl,
and polyoxazolines with the repeating unit IV

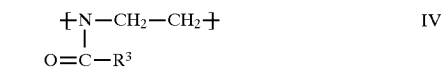

where $R^3$ is hydrogen, $C_1C_6$-alkyl, $C_5$–$C_8$-cycloalkyl, phenyl which is unsubstituted or substituted up to three times by $C_1$–$C_4$-alkyl groups, or tetrahydrofuryl and (e2) 0–5 mol %, based on the molar quantity of component (b1) used to prepare polyetheresteramide Q1, of compound D.

14. A process for preparing the biodegradable polymers T2, which comprises, in a first step, reacting
- (f1) polyetheresteramide P2 with a molecular weight ($M_n$) in the range from 5000 to 80,000 g/mol, a viscosity number in the range from 30 to 45 g/ml (measured in o-dichlorobenzene/phenol (50/50 ratio by weight) at a concentration of 0.5% by weight polyetheresteramide P2 at 25° C.) and a melting point in the range from 50 to 255° C., obtained by reacting a mixture consisting essentially of
- (g1) a mixture consisting essentially of
   20–95 mol % adipic acid or ester-forming derivatives thereof or mixtures thereof,
   5–80 mol % terephthalic acid or ester-forming derivatives thereof or mixtures thereof, and
   0–5 mol % of a compound which contains sulfonate groups,
   where the total of the individual mole percentages is 100 mol %,
- (g2) mixture (b2), consisting of dihydroxy compounds of
   (b21) from 15 to 99.3 mol % of a dihydroxy compound selected from the group consisting of $C_2$–$C_6$-alkanediols and $C_5$–$C_{10}$-cycloalkanediols,
   (b22) from 0.2 to 85 mol % of a dihydroxy compound which contains ether functionalities and has the formula I

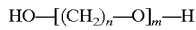
   $$HO-[(CH_2)_n-O]_m-H \qquad I$$

where n is 2, 3 or 4 and m is an integer from 2 to 250, or mixtures thereof,
   (b23) from 0.5 to 80 mol % of an amino-$C_2$–$C_{12}$-alkanol or an amino-$C_5$–$C_{10}$-cycloalkanol and
   (b24) from 0 to 50 mol % of a diamino-$C_1$–$C_8$-alkane,
   (b25) from 0 to 50 mol % of a 2,2'-bisoxazoline of the formula II

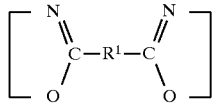

where $R^1$ is a single bond, a $(CH_2)_q$ alkylene group with q=2, 3 or 4, or a phenylene group, where the total of the individual mole percentages is 100 mol %,
where the molar ratio of (g1) to (g2) is chosen in the range from 0.4:1 to 1,5:1,
- (g3) from 0.01 to 40% by weight, based on component (g1), amino carboxylic acid B1
where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

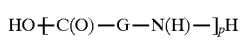 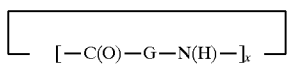

IIIa     IIIb where p is an integer from 1 to 1500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl, and polyoxazolines with the repeating unit IV

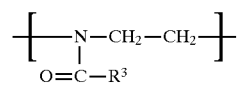

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl,
and
- (g4) from 0 to 5 mol %, based on component (g1), of compound D with at least three groups capable of ester formation, or
- (f2) a mixture consisting essentially of polyetheresteramide P1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide P1 at 25° C.) and a melting point in the range from 50° to 200° C., obtained by reacting a mixture consisting essentially of
- (b1) a mixture consisting essentially of
   (b11) 20–95 mol % adipic acid or ester-forming derivatives thereof or mixtures thereof,
   (b12) 5–80 mol % terephthalic acid or ester-forming derivatives thereof or mixtures thereof, and
   (b13) 0–5 mol % of a compound containing sulfonate groups, where 0–50 mol % of component (b11) can be replaced by at least one other aliphatic $C_4$–$C_{10}$- or cycloaliphatic $C_5$–$C_{10}$-dicarboxylic acid or dimer fatty acid, and where 0–50 mol % of component (b12) can be replaced by
      another aromatic dicarboxylic acid, where the total of the individual mole percentages being 100 mol %, and
where the molar ratio of (b1) to (b2) is chosen in the range from 0.4:1 to 1.5:1,
and 0.01 to 50% by weight, based on polyetheresteramide P1, of aminocarboxylic acid B1 or
- (f3) a mixture consisting essentially of polyetheresteramides P1 which differ from one another in composition with 0.1 to 5% by weight, based in the amount of polyetheresteramides used, of divinyl ether C1 and
with 0 to 5 mol %, based on the respective molar quantities of component (g1) or component (b1) which were used to prepare the polyetheresteramides P2 used or the mixtures (f2) or (f3), of compound D with at least three groups capable of ester formation.

15. A process for the preparation of biodegradable thermoplastic molding compositions T4, comprising, in a first step, mixing polyetheresteramide Q1 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight polyetheresteramide Q1 at 25° C.), and a melting point in the range from 50° to 200° C., obtained by reacting a mixture of
- (a1) from 95 to 99.9% by weight polyetheresteramide P1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight polyetheresteramide P1 at 25° C.) and a melting point in the range from 50° to 200° C., obtained by reacting a mixture consisting essentially of (b1) a mixture consisting essentially of
(b11) 20–95 mol % adipic acid or ester-forming derivatives thereof or mixtures thereof, and
(b12) 5–80 mol % terephthalic acid or ester-forming derivatives thereof or mixtures thereof, and
(b13) 0–5 mol % of a compound containing sulfonate groups, where 0–50 mol % of component (b11) can be replaced by at least one other aliphatic $C_4$–$C_{10}$- or cycloaliphatic $C_5$–$C_{10}$-dicarboxylic acid or dimer fatty acid, and where 0–50 mol % of component (b12) can be replaced by another aromatic dicarboxylic acid, where the total of the individual mole percentages being 100 mol %, and
(b2) a mixture of dihydroxy compounds composed of
(b21) from 15 to 99.3 mol % of a dihydroxy compound selected from the group consisting of $C_2$–$C_6$-alkanediols and $C_5$–$C_{10}$-cycloalkanediols,
(b22) from 0.2 to 85 mol % of a dihydroxy compound which contains ether functionalities and has the formula I $$HO-[(CH_2)_n-O]_m-H \qquad I$$

where n is 2, 3 or 4 and m is an integer from 2 to 250, or mixtures thereof,
(b23) from 0.5 to 80 mol % of an amino-$C_2$–$C_{12}$-alkanol or an amino-$C_5$–$C_{10}$-cycloalkanol and
(b24) from 0 to 50 mol % of a diamino-$C_1$–$C_8$-alkane,
(b25) from 0 to 50 mol % of a 2,2'-bisoxazoline of the general formula II

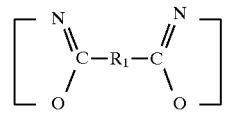

where $R^1$ is a single bond, a $(CH_2)_q$ alkylene group with q=2, 3 or 4, or a phenylene group, where the total of the individual mole percentages is 100 mol %,
where the molar ratio of (b1) to (b2) is chosen in the range from 0.4:1 to 1.5:1,
(a2) from 0.1 to 5% by weight of a divinyl ether C1 and
(a3) from 0 to 5 mol %, based on component (b1) from the preparation of P1, of compound D with at least three groups capable of ester formation,
and in a second step mixing from 99.5 to 0.5% by weight of polyetheresteramide Q1 with
0.5–99.5% by weight of hydroxycarboxylic acid H1 of the general formula Va or Vb $$HO-[-C(O)-M-O-]_xH \qquad Va$$

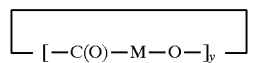

where x is an integer from 1 to 1500 and y is an integer from 1 to 4, and M is a radical which is selected from the group consisting of phenylene, —$(CH_2)_z$—, where z is an integer from 1 to 5, —$C(R^2)H$— and —$C(R^2)HCH_2$ where $R^2$ is methyl or ethyl.

* * * * *

UNITED STATES PATENT AND TRADEMARK OFFICE
CERTIFICATE OF CORRECTION

PATENT NO.: 5,863,991

DATED: January 26, 1999

INVENTOR(S): WARZELHAN et al.

It is certified that error appears in the above-identified patent and that said Letters Patent is hereby corrected as shown below:

Col. 24, claim 13, line 43, "obtainable" should be --obtained--.

Col. 24, claim 13, line 62, "$C_1C_6$-alkyl" should be --$C_1$-$C_6$-alkyl--.

Col. 25, claim 14, line 5, "45 g/ml" should be --450 g/ml--.

Col. 25, claim 14, line 47, "1,5:1" should be --1.5:1--.

Col. 25, claim 14, line 60, in formula IIIB, the subscript "$x$" should be --$r$--.

Signed and Sealed this

Twenty-fifth Day of May, 1999

*Attest:*

Q. TODD DICKINSON

*Attesting Officer*     Acting Commissioner of Patents and Trademarks